(12) United States Patent
Sugiura et al.

(10) Patent No.: US 8,762,612 B2
(45) Date of Patent: Jun. 24, 2014

(54) COMMUNICATION SLAVE (75) Inventors: Yoshie Sugiura, Nagoya (JP); Toshihiko Matsuoka, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 543 days.

(21) Appl. No.: 13/032,040

(22) Filed: Feb. 22, 2011

(65) Prior Publication Data
US 2011/0208886 A1 Aug. 25, 2011

(30) Foreign Application Priority Data

Feb. 24, 2010 (JP) ................................. 2010-038628
Aug. 3, 2010 (JP) ................................. 2010-174450

(51) Int. Cl.
G06F 3/00 (2006.01)
G06F 13/00 (2006.01)
G06F 1/00 (2006.01)

(52) U.S. Cl.
USPC ................................. 710/110; 710/9; 713/300

(58) Field of Classification Search
USPC ................................. 710/110, 8–10; 713/300
See application file for complete search history.

(56) References Cited

U.S. PATENT DOCUMENTS

| 5,404,325 | A * | 4/1995 | Shibata | 365/149 |
| 5,675,811 | A * | 10/1997 | Broedner et al. | 713/323 |
| 5,781,627 | A * | 7/1998 | Ikuta et al. | 711/163 |
| 6,205,556 | B1 * | 3/2001 | Watanabe et al. | 713/330 |
| 6,392,558 | B1 * | 5/2002 | Schulmeyer et al. | 340/9.16 |
| 6,397,280 | B1 * | 5/2002 | Nitschke et al. | 710/110 |
| 6,470,289 | B1 * | 10/2002 | Peters et al. | 702/132 |
| 7,076,571 | B2 * | 7/2006 | Dunstan | 710/8 |
| 8,122,159 | B2 * | 2/2012 | Monreal | 710/9 |
| 2003/0034883 | A1 | 2/2003 | Sato et al. | |
| 2005/0132109 | A1 * | 6/2005 | Steger | 710/104 |
| 2006/0224776 | A1 | 10/2006 | Vanderhenst | |
| 2007/0198139 | A1 * | 8/2007 | Boran et al. | 701/1 |
| 2010/0121534 | A1 | 5/2010 | Tanaka | |
| 2011/0125945 | A1 * | 5/2011 | Link et al. | 710/110 |

FOREIGN PATENT DOCUMENTS

| CA | 1169962 | A1 * | 6/1984 | G11C 7/00 |
| CN | 102164064 | A * | 8/2011 | H04L 12/40 |
| FR | 2727588 | A1 * | 5/1996 | H04B 1/48 |
| JP | 55004716 | A * | 1/1980 | G11C 11/40 |
| JP | 2000148261 | A * | 5/2000 | G06F 1/45 |
| JP | A-2009-239429 | | 10/2009 | |

OTHER PUBLICATIONS

Office Action dated Mar. 26, 2013 in corresponding CN patent application No. 201110047245.6 (and English translation).
Office Action dated Oct. 25, 2013 issued in the corresponding CN application No. 201110047245.6 (English translation).

* cited by examiner

Primary Examiner — Faisal M Zaman
(74) Attorney, Agent, or Firm — Posz Law Group, PLLC (57) ABSTRACT A communication slave used in a communication network system includes a control device, a capacitive element, a voltage determining portion, and a time measuring portion. The control device controls communication with a master. The capacitive element is coupled between a high-potential side bus and a low-potential side bus. The voltage determining portion determines whether a voltage between the buses exceeds a threshold voltage. The time measuring portion measures a time from when a charge of the capacitive element through the buses is started to when the voltage determining portion determines that the voltage exceeds the threshold voltage. The control device sets an ID value for communicating with the master based on a length of the time measured by the time measuring portion.

6 Claims, 12 Drawing Sheets

FIG. 3A  VOLTAGE
MASTER

FIG. 3B  VOLTAGE
SLAVE 2a

FIG. 3C  VOLTAGE
SLAVE 2b

FIG. 3D  VOLTAGE
SLAVE 2c

COMMUNICATION SLAVE

CROSS REFERENCE TO RELATED APPLICATIONS

The present application is based on and claims priority to Japanese Patent Applications No. 2010-38628 filed on Feb. 24, 2010, and No. 2010-174450 filed on Aug. 3, 2010, the contents of which are incorporated in their entirety herein by reference.

BACKGROUND OF THE INVENTION

1. Field of the Invention

The present invention relates to a communication slave that is used in a communication network system including a master and a plurality of communication slaves coupled through a pair of buses in a daisy chain manner.

2. Description of the Related Art

A protocol of a communication network that includes a master and a plurality of slaves coupled through a pair of buses in a daisy-chain manner includes a DSI (distributed system interface) and a SbW (safe by wire). The communication network needs to set an ID value to each of the slaves so that the master can perform a serial communication with the slaves. For example, JP-A-2003-152741 (corresponding to US 200310034883 A1) discloses a communication apparatus in which each of plurality of slave devices inserts a switch into a power source line that forms a bus, a master device sets ID values of the slave devices through the bus in order from the slave device close to the master device based on a connection order of the slave devices and ID values stored in the master device, and the slave device whose ID value is set turns on the switch one by one so that a next slave is coupled with the bus.

When the switch is inserted into the bus, an element such as a transistor for forming the switch needs to reduce an on-resistance value. Accordingly, a dimension of the switch may be increased, and a dimension of each of the slave, eventually, a dimension of the whole communication network system may be increased.

SUMMARY OF THE INVENTION

In view of the foregoing problems, it is an object of the present invention to provide a communication slave that can appropriately set an ID value without inserting a switch into a bus.

A communication slave according to an aspect of the present invention is used in a communication network system in which a master and a plurality of the communication slaves are coupled through a high-potential side bus and a low-potential side bus in a daisy-chain manner and includes a control device, a capacitive element, a voltage determining portion, and a time measuring portion. The control device controls communication with the master. The capacitive element is coupled between the high-potential side bus and the low-potential side bus. The voltage determining portion determines whether a voltage between the high-potential side bus and the low-potential side bus exceeds a threshold voltage. The time measuring portion measures a time from when a charge of the capacitive element through the high-potential side bus and the low-potential side bus is started to when the voltage determining portion determines that the voltage exceeds the threshold voltage. The control device sets an ID value for communicating with the master based on a length of the time measured by the time measuring portion.

The above-described communication slave can appropriately set a unique ID value without inserting a switch having a low on-resistance into a bus. Thus, a dimension of the communication slave and a dimension of the whole communication network system can be reduced.

A communication slave according to another aspect of the present invention is used in a communication network system in which a master and a plurality of the communication slaves are coupled through a high-potential side bus and a low-potential side bus in a daisy-chain manner and includes a control device, a capacitive element, a voltage determining portion, and a current detecting portion. The control device controls communication with the master. The capacitive element is coupled between the high-potential side bus and the low-potential side bus. The voltage determining portion determines whether a voltage between the high-potential side bus and the low-potential side bus exceeds a threshold voltage. The current detecting portion detects current change generated in the high-potential side bus when the control device transmits a response signal to the master. When a first charge of the capacitive element through the high-potential side bus and the low-potential side bus is started and the voltage determining portion determines that the voltage exceeds the threshold voltage, the control device transmits the response signal to the master after a waiting time elapses. The control device counts the number of current change detected by the current detecting portion until an ID setting time elapses. After the ID setting time elapses, the control device sets an ID value for communicating with the master based on the number of current change.

The above-described communication slave can appropriately set a unique ID value without inserting a switch having a low on-resistance into a bus. Thus, a dimension of the communication slave and a dimension of the whole communication network system can be reduced.

BRIEF DESCRIPTION OF THE DRAWINGS

Additional objects and advantages of the present invention will be more readily apparent from the following detailed description of preferred embodiments when taken together with the accompanying drawings. In the drawings.

DETAILED DESCRIPTION OF THE PREFERRED EMBODIMENTS

First Embodiment

Figure 1:
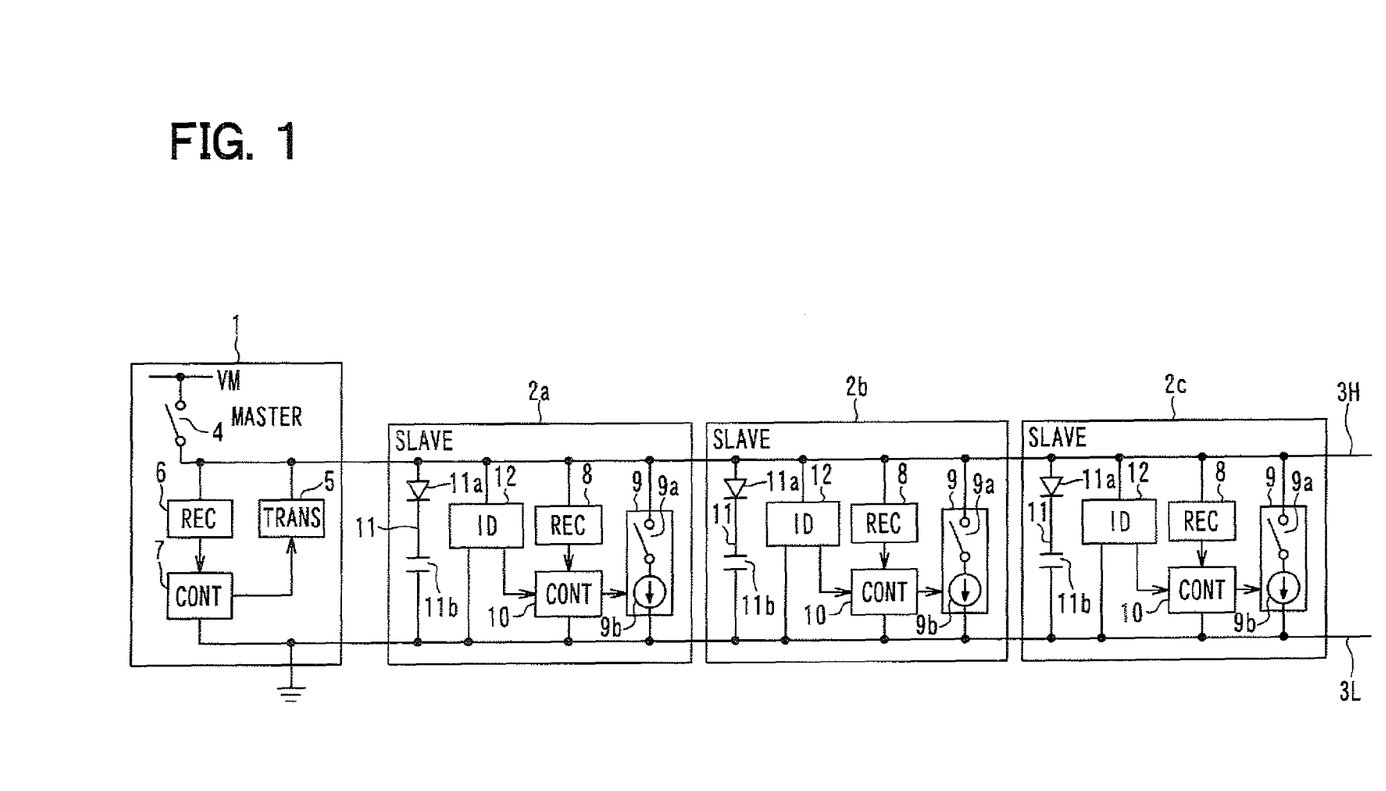
FIG. 1 is a diagram showing a communication network system according to a first embodiment of the present invention.
Figure 4:
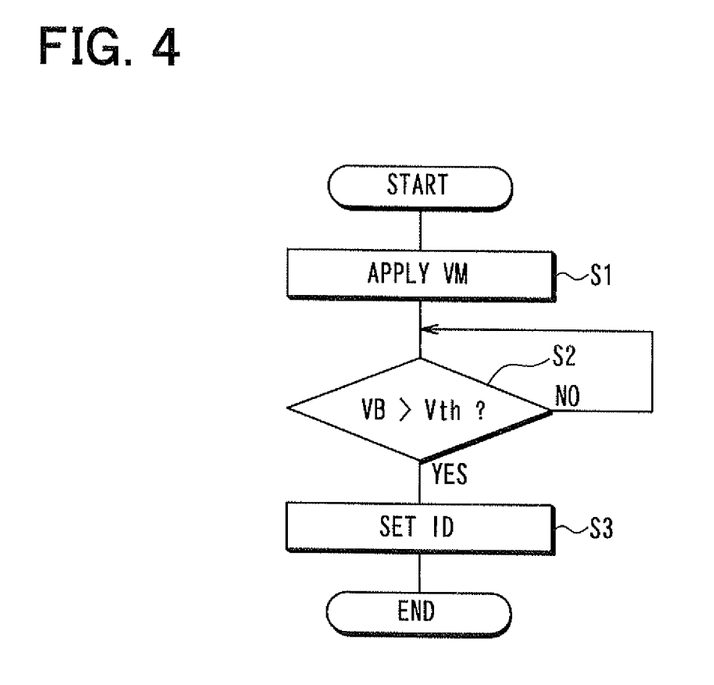
FIG. 4 is a flow diagram showing a process performed by the master and the slaves when the master supplies power to the slaves for the first time.

A communication network system according to a first embodiment of the present invention will be described with reference to FIG. 1 and FIG. 4. As shown in FIG. 1, the communication network system includes a master 1 and a plurality of slaves 2a-2c, and a pair of communication buses 3H and 3L. The slaves 2a-2c can operate as communication slaves. The communication bus 3H can operate as a high-potential side bus, and the communication bus 3L can operate as a low-potential side bus. The slaves 2a-2c are coupled with the master 1 through the communication buses 3H and 3L in a daisy chain manner. The master 1 includes a switch 4. The communication bus 3H is applied with a power-supply voltage VM through the switch 4. The communication bus 3L is applied with a ground potential.

The master 1 further includes a transmitter (TRANS) 5, a receiver (REC) 6, and a control device (CONT) 7. The transmitter 5 transmits signals to the slaves 2a-2c through the communication buses 3H and 3L. The receiver 6 receives response signals from the slaves 2a-2c through the communication buses 3H and 3L. The control device 7 controls the switch 4, the transmitter 5, and the receiver 6. The control device 7 includes a microcomputer. The control device 7 controls the transmitter 5 so as to change a potential difference between the communication buses 3H and 3L and thereby transmitting the signals from the master 1. The response signal received with the receiver 6 is input to the control device 7.

Each of the slaves 2a-2c includes a receiver (REC) 8, a transmitter 9, a control device (CONT) 10, a holding circuit 11, and an ID determining circuit (ID) 12. The receiver 8 receives the signal transmitted from the master 1. The transmitter 9 transmits the response signal to the master 1. The control device 10 controls the receiver 8 and the transmitter 9. The control device 10 includes a microcomputer. The receiver 8 transmits received data to the control device 10 by comparing a voltage change in the communication buses 3H and 3L driven by the master 1 with a reference voltage using a comparator (not shown). The transmitter 9 includes a switch 9a and a current source 9b coupled in series between the communication buses 3H and 3L. When the control device 10 controls an on-off state of the switch 9a, electric current that flows to the communication buses 3H and 3L are changed, and thereby the response signal is transmitted to the master 1.

The holding circuit 11 holds power supplied from the master 1 through the communication buses 3H and 3L. The power held by the holding circuit 11 is stabilized by a power stabilizing circuit (not shown) and is used as power for operating each part. For example, like DSI, a power supply phase and a communication phase may be alternately changed. The holding circuit 11 includes a diode 11a and a capacitor 11b coupled in series. The capacitor 11b can operate as a capacitive element. When the master 1 starts to supply the power to the control device 10, the ID determining circuit 12 determines an ID value for communicating with the master 1.

Figure 2:
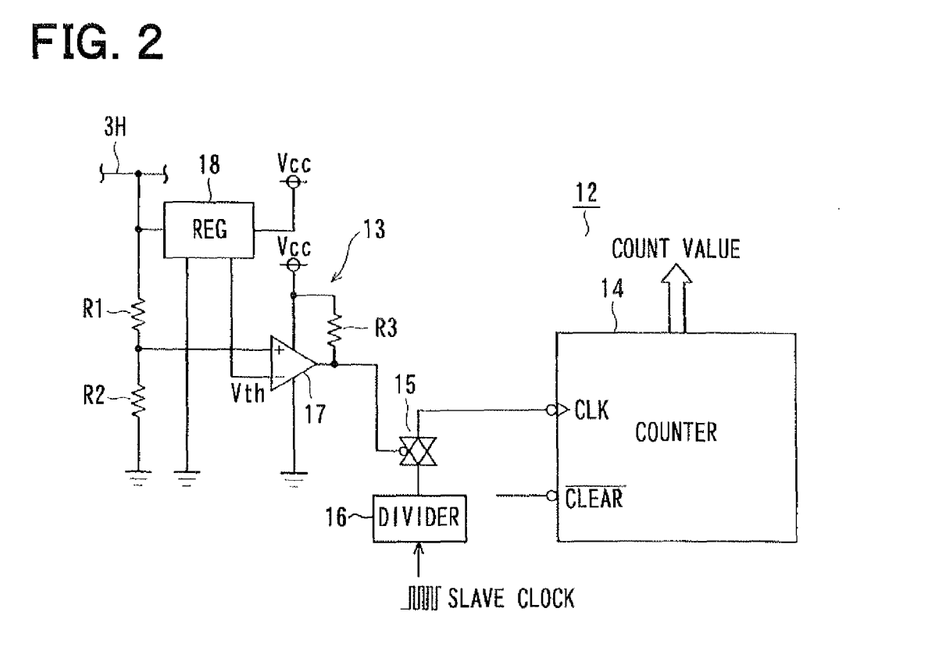
FIG. 2 is a diagram showing an ID determining circuit according to the first embodiment.

As shown in FIG. 2, the ID determining circuit 12 includes a voltage determining circuit 13, a counter 14, an analog switch 15, and a divider 16. The voltage determining circuit 13 can operate as a voltage determining portion. The counter 14 can operate as a time measuring portion. The voltage determining circuit 13 includes a comparator 17, a regulator (REG) 18, and resistance elements R1-R3. The resistance elements R1 and R2 are coupled in series between the communication bus 3H and the ground. The regulator 18 is also coupled between the communication bus 3H and the ground. The regulator 18 includes, for example, a band gap reference (BGR) circuit. When the regulator 18 receives the power from the communication buses 3H and 3L, the regulator 18 generates the power voltage Vcc for operating each part in a corresponding one of the slaves 2a-2c and a threshold voltage Vth of the comparator 17.

A non-inverting input terminal is coupled with a common connection point of the resistance elements R1 and R2. An inverting input terminal of the comparator 17 receives the threshold voltage Vth from the regulator 18. An output terminal of the comparator 17 is pulled up to the power voltage Vcc through the resistance element R3. The comparator 17 compares a partial voltage of the communication bus 3H input to the non-inverting input terminal with the threshold voltage Vth applied to the inverting input terminal.

The output terminal of the comparator 17 is coupled with a control terminal (negative logic) of the analog switch 15. One end of the analog switch 15 is coupled with the divider 16, and the other end of the analog switch 15 is coupled with a clock terminal (negative logic) of the counter 14. The divider 16 divides a slave clock, which is an operation clock of the control device 10, with a dividing ratio of 1/R. The divided clock is applied to a clock terminal of the counter 14 through the analog switch 15. The counter 14 outputs a count value to the control device 10. In a case where each of the slaves 2a-2c is applied with the power for the first time, a clear terminal (negative logic) becomes activated and is cleared while a power-on reset acts on the control device 10, and the clear terminal becomes inactive at a time when the power-on reset is released.

Figures 3A, 3B:
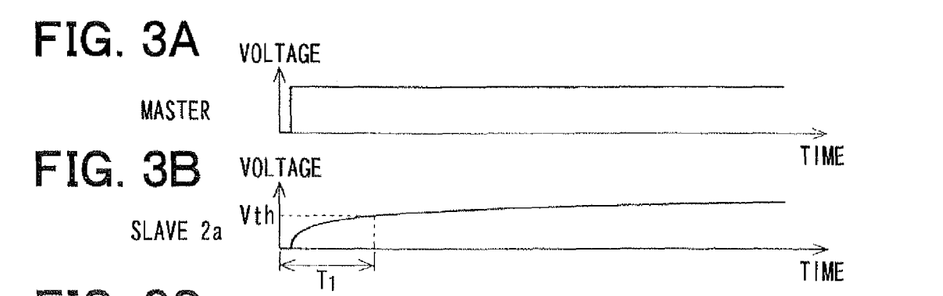
FIG. 3A to FIG. 3D are timing diagrams showing voltage changes in a master and slaves when the master supplies power to the slaves for the first time.
Figure 3C:
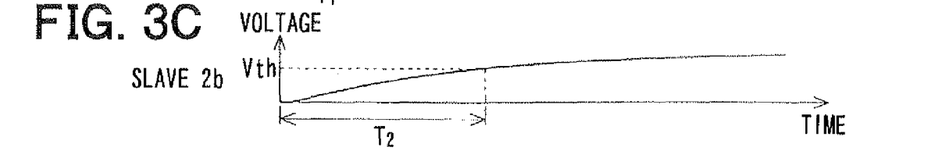
Figure 3D:
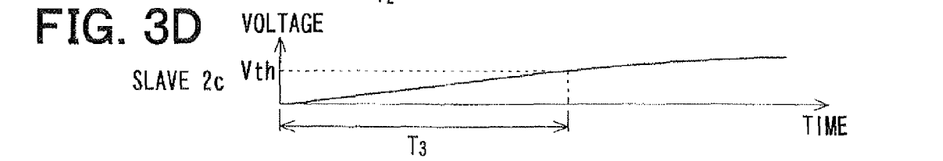

An operation of the communication network system according to the present embodiment will be described with reference to FIG. 3A to FIG. 3D and FIG. 4. When the master 1 turns off the switch 4 and supplies the power to the slaves 2a-2c through the communication buses 3H and 3L for the first time as shown in FIG. 3A, bus voltages VB between the communication buses 3H and 3L detected by the slaves 2a-2d change as shown in FIG. 3B to FIG. 3D. Furthermore, when the master 1 supplies the power to the slaves 2a-2c for the first time, the master 1 and the slaves 2a-2c perform a process shown in FIG. 4.

When the master 1 starts to apply the power-supply voltage VM to the communication bus 3H at S1, the capacitor 11b in the holding circuit 11 in each of slaves 2a-2c is charged through a resistance component included in the communication bus 3H. Thus, the bus voltage VB detected at each of the slaves 2a-2c increases with time in accordance with a RC time constant. Because the RC time constants of the slaves 2a-2c increase from upstream to downstream, that is, with distance from the master 1, increasing rates of the bus voltages VB decrease from upstream to downstream. When the voltage determining circuit 13 in the slave 2a determines that the bus voltage VB exceeds the threshold voltage Vth at time $T_1$, the voltage determining circuit 13 in the slave 2b determines that the bus voltage VB exceeds the threshold voltage Vth at time $T_2$, and the voltage determining circuit 13 in the save 2c determines that the bus voltage VB exceeds the threshold voltage Vth at time $T_3$, as shown in FIG. 3B-3D, a relationship among times $T_1$-$T_3$ is $T_1<T_2<T_3$. Each of the times $T_1$-$T_3$ at which the bus voltage VB exceeds the threshold voltage Vth is referred to as a rising time.

In the ID determining circuit 12, an output level of the comparator 17 is low until the bus voltage VB exceeds the threshold voltage Vth. Thus, the divided clock is supplied to the counter 14, and the counter 14 counts at negative edges of the divided clock. When the bus voltage VB exceeds the threshold voltage VB, which corresponds to "YES" at S2, the output level of the comparator 17 transitions to the high level, and the supply of the divided clock to the counter 14 is stopped. Thus, the count value output from the counter 14 at the time corresponds to the rising time.

The control device 10 refers to, for example, the output signal of the comparator 17, and after the control device 10 detects that the output level transitions from the low level to the high level, the control device 10 reads the count value of the counter 14. The control device 10 previously stores a table that indicates a relationship between count values corresponding to $T_1$, $T_2$, $T_3$ and ID values in a non-volatile memory. At S3, the control device 10 sets an ID value of corresponding one of the slaves 2a-2d based on the count value from the counter 14 and the table stored in the non-volatile memory. For example, in a case where a capacitance of the capacitor 11b is on the order of μF, the ID value is set to 1 when the rising time is in a range from 0 μs to 150 μs ($T_1$), the ID value is set to 2 when the rising time is in a range from 150 μs to 450 μs ($T_2$), and the ID value is set to 3 when the rising time is in a range from 450 μs to 700 μs ($T_3$). After a time required for the slaves 2a-2c to set the ID values elapses, the master 1 communicates with the slaves 2a-2c individually with specifying the ID value.

In a case where the capacitance of the capacitor 11b in each of the slaves 2a-2c is not sufficient to provide time differences in the rising times of the slaves 2a-2c, additional capacitor may be coupled.

As described above, in each of the slaves 2a-2c according to the present embodiment, the counter 14 measures a time from when a charge of the capacitor 11b through the communication buses 3H and 3L is started to when the voltage determining circuit 13 determines that the bus voltage VB exceeds the threshold voltage Vth, and the control device 10 sets the ID value for communicating with the master 1 based on the time measured by the counter 14. Thus, the slaves 2a-2c can autonomously set the ID values unique to each other without inserting a switch having a low on-resistance into the communication buses 3H and 3L. Thus, a dimension of the slaves 2a-2c and a dimension of the communication network system can be reduced. In addition, because the capacitor 11b for holding the power supplied through the communication buses 3H and 3L is used as a capacitive element, the slaves 2a-2c can be formed without adding another element.

Reference Example

Figure 5:
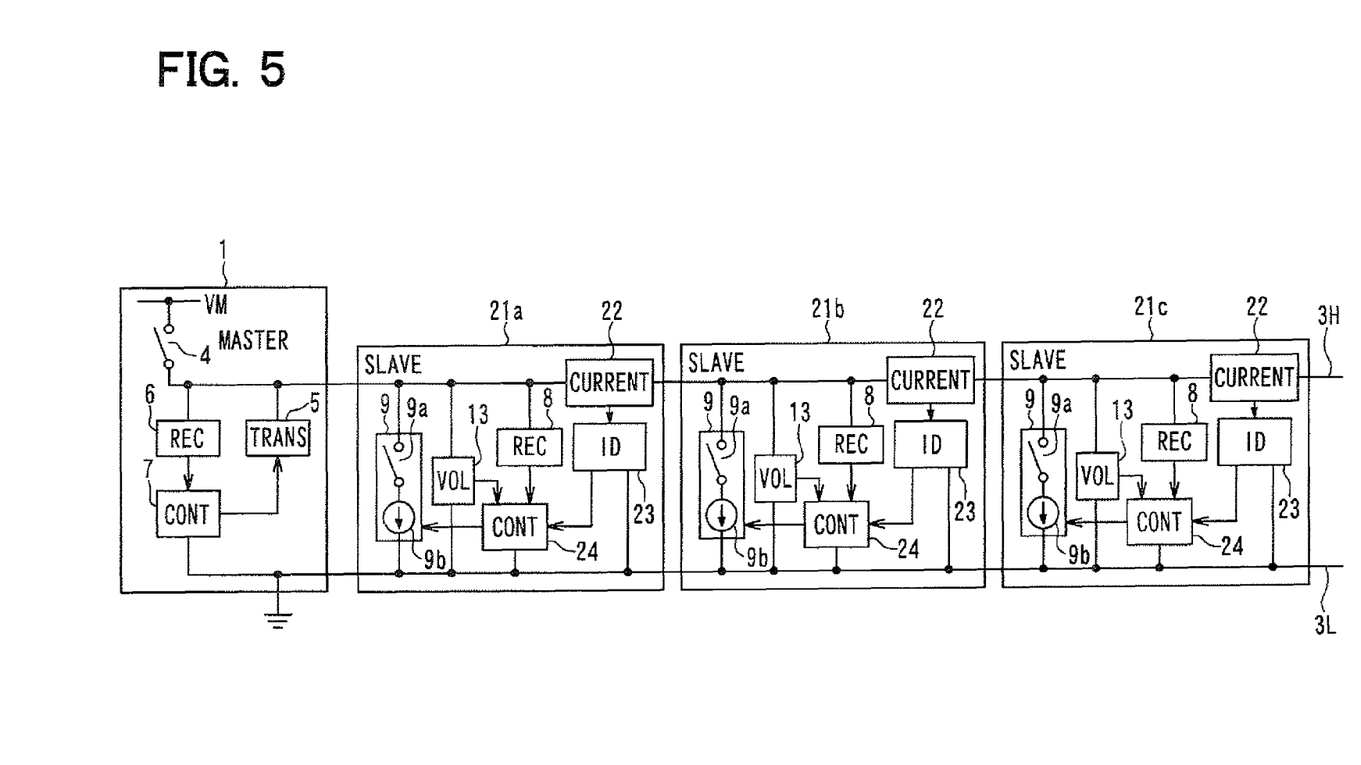
FIG. 5 is a diagram showing a communication network system according to a reference example.

A communication network system according to a reference example will be described with reference to FIG. 5 and FIG. 6. The communication network system includes the master 1, slaves 21a-21c, and the communication buses 3H and 3L. The slaves 21a-21c are coupled with the master 1 through the communication buses 3H and 3L in a daisy chain manner. Each of the slaves 21a-21c includes the receiver (REG) 8, the transmitter 9, the holding circuit 11 (not shown), the voltage determining circuit (VOL) 13, a current sensor (CURRENT) 22, an ID determining circuit (ID) 23, and a control device (CONT) 24. The current sensor 22 can operate as a current detecting portion. The control device 24 can operate as a measuring portion. The transmitter 9 is disposed on the upstream side of each of the slaves 21a-21c, and the current sensor 22 is disposed on the downstream side of each of the slaves 21a-21c. An output signal of the current sensor 22 is input to the ID determining circuit 23, and an output signal of the ID determining circuit 23 is input to the control device 24.

In the reference example, the voltage determining circuit 13 is not included in the ID determining circuit 23 and is disposed independently. An output signal of a comparator 17 in the voltage determining circuit 13 is input to an input terminal of the control device 24. The current sensor 22 may be an open-loop current sensor or a closed-loop current sensor using a hole element, a MR current sensor using a magnetic resistance element, or a current sensor using a shunt resistor.

Figure 6:
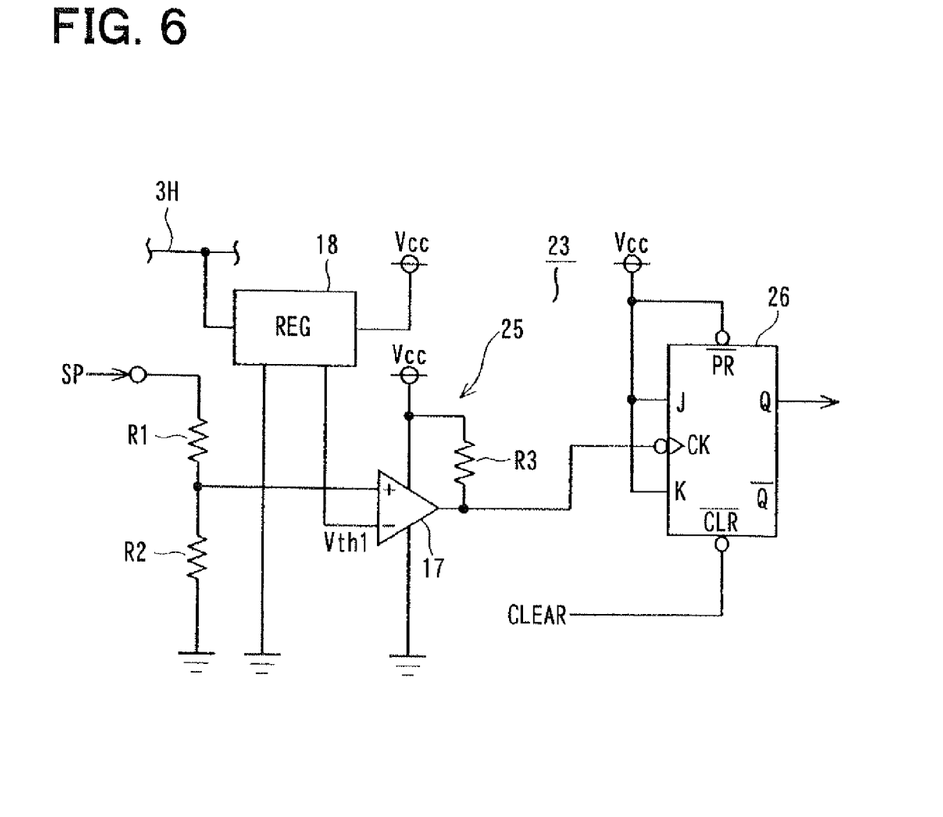
FIG. 6 is a diagram showing an ID determining circuit according to the reference example.

The ID determining circuit 23 includes a voltage determining circuit 25 and a JK flip flop 26 as shown in FIG. 6. The voltage determining circuit 25 includes a comparator 17, a regulator (REG) 18, and resistance elements R1-R3 in a manner similar to the voltage determining circuit 13. An upper terminal of the resistance element R1 is coupled with an output terminal of the current sensor 22. The regulator 18 supplies a threshold voltage Vth1 to an inverting input terminal of the comparator 17. An output terminal of the comparator 17 is coupled with a clock terminal (negative logic) of the JK flip flop 26. Each terminal of J, K, PR (negative logic) of the JK flip flop 26 is pulled up to the power voltage Vcc.

When the current sensor 22 detects a change in electric current flowing in the communication bus 3H and outputs a pulsed signal Sp in a state where the JK flip flop 26 is cleared, the comparator 17 in the voltage determining circuit 25 compares the pulsed signal Sp with the threshold voltage Vth1 and outputs a signal with shaping waveform. The JK flip flop 26 is set at a falling edge of the signal output from the comparator 17 and an output level of an output terminal Q transitions from the low level to the high level.

An operation of the communication network system according the reference example will be described with reference to FIG. 7 and FIG. 8A to FIG. 8D. In a case where the communication network system alternately executes a power supply phase and a communication phase like DSI, each of the slaves 21a-21c sets an ID value while transmitting a response signal (acknowledge) to the master 1 as shown in FIG. 8A to FIG. 8D, and the master 1 and the slaves 21a-21c perform a process shown in FIG. 7.

In the reference example, a capacitance of the capacitor 11b in the holding circuit 11 (not shown) is set to the minimum capacitance that is required for holding power to be supplied to an internal circuit of each of the slaves 21a-21c during the communication phase. Thus, rising times of bus voltages VB detected at the slaves 21a-21c are almost the same regardless of positions of the communication buses 3H and 3L where the slaves 21a-21c are coupled.

Figure 7:
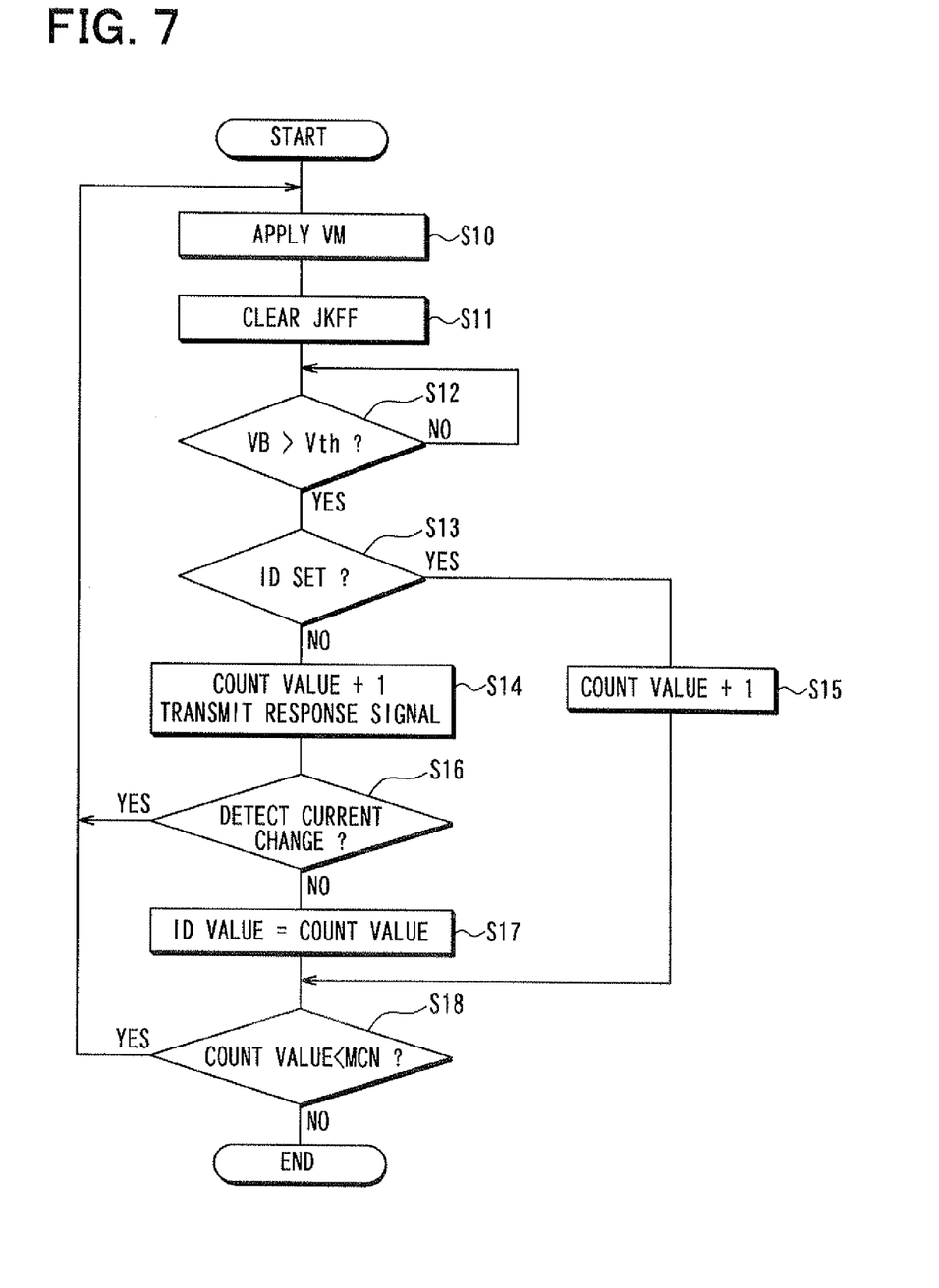
FIG. 7 is a flow diagram showing a process performed by a master and slaves in the communication network system according to the reference example.
Figures 8A, 8B:
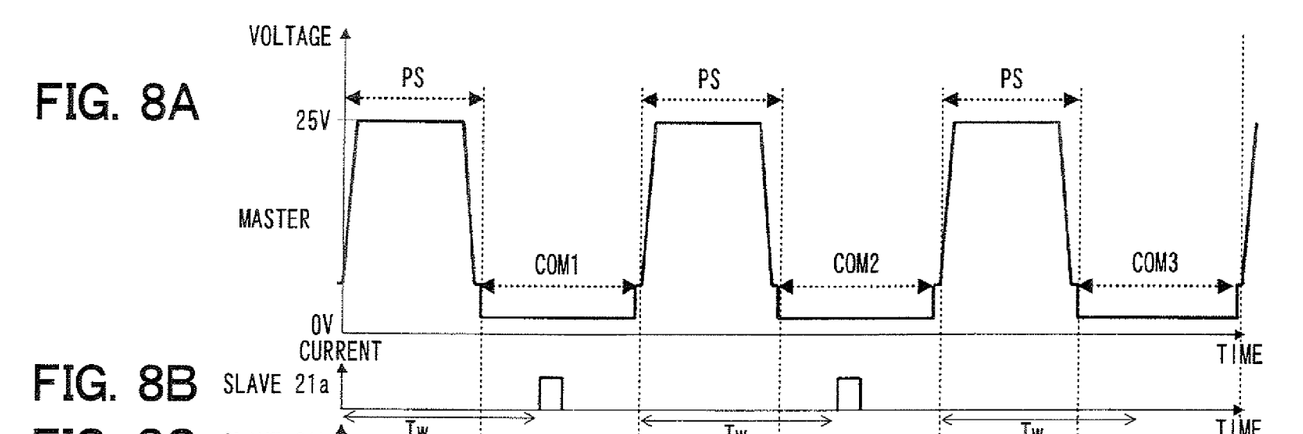
FIG. 8A is a timing diagram showing a voltage applied by the master and FIG. 8B to FIG. 8D are timing diagrams showing electric currents detected by the slaves according to the reference example.
Figures 8C, 8D:
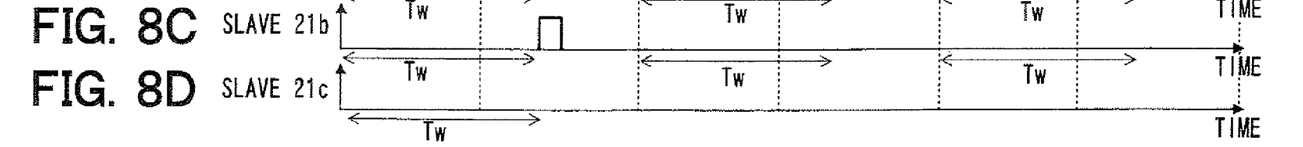

Each of the slaves 21a-21c transmits the response signal to the master 1 during the communication phase until each of the saves 21a-21c sets the ID value. When the master 1 starts to apply a power-supply voltage VM of, for example, 25 V to the communication bus 3H during a power supply phase (PS) at S10, the control device 24 in each of the slaves 21a-21c clears the JK flip flop (JKFF) 26 at S11. At S12, the control device 24 in each of the slaves 21a-21c determines whether the bus voltage VB exceeds the threshold voltage Vth based on an output signal from the voltage determining circuit 13.

When the slaves 21a-21c determine that the bus voltage VB exceeds the threshold voltage Vth at almost the same time, which corresponds to "YES" at S12, the control device 24 in each of the slaves 21a-21c determines whether the ID value of the corresponding one of the slaves 21a-21c has already been set. When the control device 24 determines that the ID value has not already been set, which corresponds to "NO" at S13, the process proceeds to S14. At S14, the control device 24 increments a count value of counting the number of a voltage application by the master 1 by 1. After the elapse of a predetermined waiting time Tw, the control device 24 turns on the switch 9a of the transmitter 9 so as to transmit the response signal to the master 1 through the communication buses 3H and 3L. At S16, the control device 24 refers the output level of the output terminal Q of the JK flip flop 26 and determines whether the current sensor 22 detects a change in the electric current that flows in the communication buses 3H and 3L.

In each of the slaves 21a-21c, the transmitter 9 is disposed on the upstream side and the current sensor 22 is disposed downstream of the transmitter 9. Thus, even when the transmitter 9 in one of the slaves 21a-21c transmits the response signal by driving the communication buses 3H and 3L, the current sensor 22 in the one of the slaves 21a-21c does not detect a change in the electric current in the communication buses 3H and 3L caused by the transmitter 9 in the one of the slaves 21a-21c. When the transmitter 9 in other one of the slaves 21a-21c located downstream thereof transmits the response signal, the current sensor 22 in the one of the slaves 21a-21c detects a change in the electric current in the communication buses 3H and 3L. Thus, when there is another slave located downstream thereof, the determination result at S16 is "YES," and the process returns to S10. When there is no slave located downstream thereof, the determination result at S16 is "NO" and the process proceeds to S17.

At S17, the control device 24 sets the count value of the number of voltage application at the time as the ID value. At S18, the control device 24 determines whether the count value of the number of voltage application is less than the maximum connection number (MCN) of slaves set in accordance with each communication specification. The maximum connection number is a predetermined value. For example, the maximum connection number is 15. When the control device 24 determines that the count value of the number of voltage application is less than the maximum connection number, which corresponds to "YES" at S18, the process returns to S10. After the ID value is set at S17, the determination result at S13 becomes "YES," and the process proceeds to S15. At S15, the control device 24 increments the count value of the number of voltage application by 1 and the process proceeds to S18. When the count value of the number of voltage application is not less than the maximum connection number, which corresponds to "NO" at S18, the process ends.

As shown in FIG. 8A to FIG. 8D, during a first communication phase (COM1), all the slaves 21a-21c transmit the response signals. However, in the slave 21c located at a downstream end of the communication buses 3H and 3L, the current sensor 22 does not detect a change in the electric current in the communication buses 3H and 3L . . . . Thus, the control device 24 in the slave 21c determines "NO" at S16, and the ID value of the slave 21c is set to 1. During a second communication phase (COM2), the slaves 21a and 21c transmit the response signals. However, in the slave 21b, the current sensor 22 does not detect a change in the electric current, and the control device 24 determines "NO" at S16. Thus, the ID value of the slave 21b is set to 2. During a third communication phase (COM3), only the slave 21a transmits the response signal. In the slave 21a, the current sensor 22 does not detect a change in the electric current, and the control device 24 determines "NO" at S16. Thus, the ID value of the slave 21a is set to 3.

As described above, in the reference example, the control device 24 in each of the slaves 21a-21c transmits the response signal every time the power is intermittently applied through the communication buses 3H and 3L until the control device 24 sets the ID value, and the current sensor 22 detects a change in the electric current caused by the transmission of the response signal by a slave located downstream thereof. The control device 24 counts the number of intermittent voltage application from when the master 1 starts to supply the power and sets the ID value for communicating with the master 1 based on the number of voltage application that is counted until no change in electric current is detected by the current sensor 22. Thus, also in the reference example, the slaves 21a-21c can set the ID values unique to each other without inserting a switch having a low on-resistance to the communication buses 3H and 3L. The slaves 21a-21c may also set the ID values by counting the number of current change detected by the current sensor 22 instead of the number of intermittent voltage application by the master 1.

Second Embodiment

Figure 9:
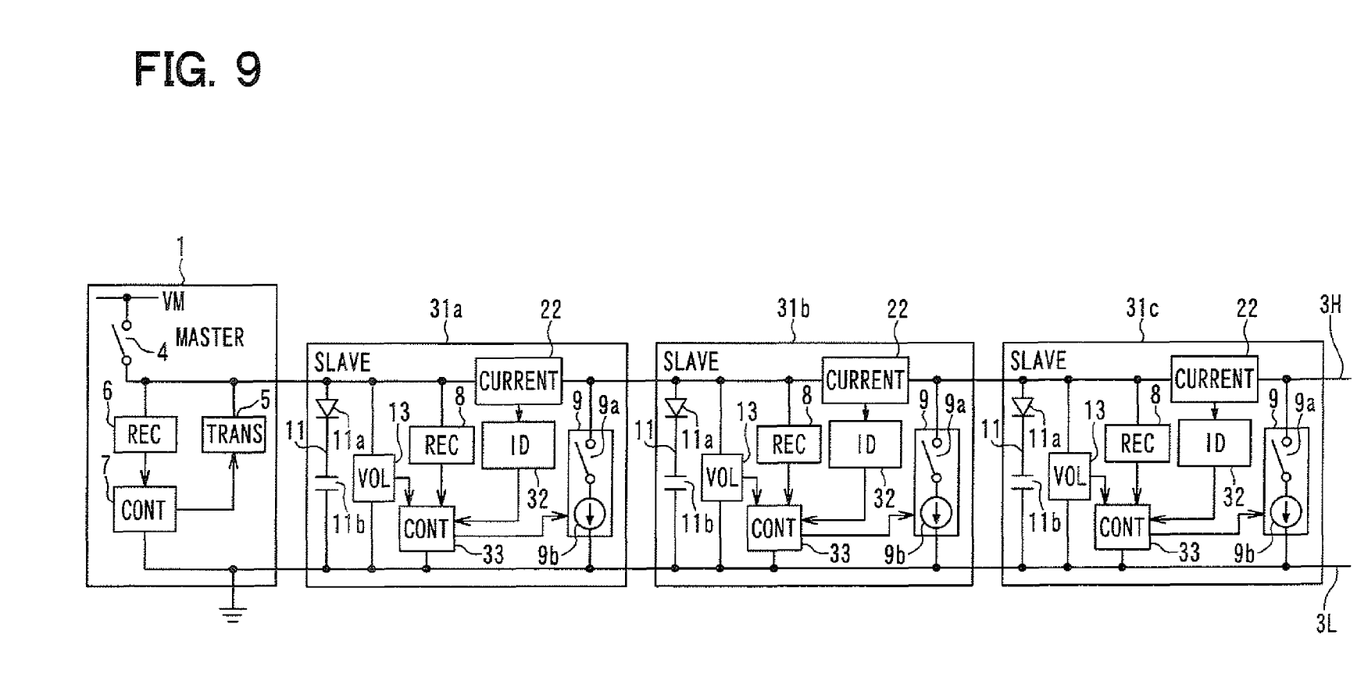
FIG. 9 is a diagram showing a communication network system according to a second embodiment of the present invention.
Figure 10:
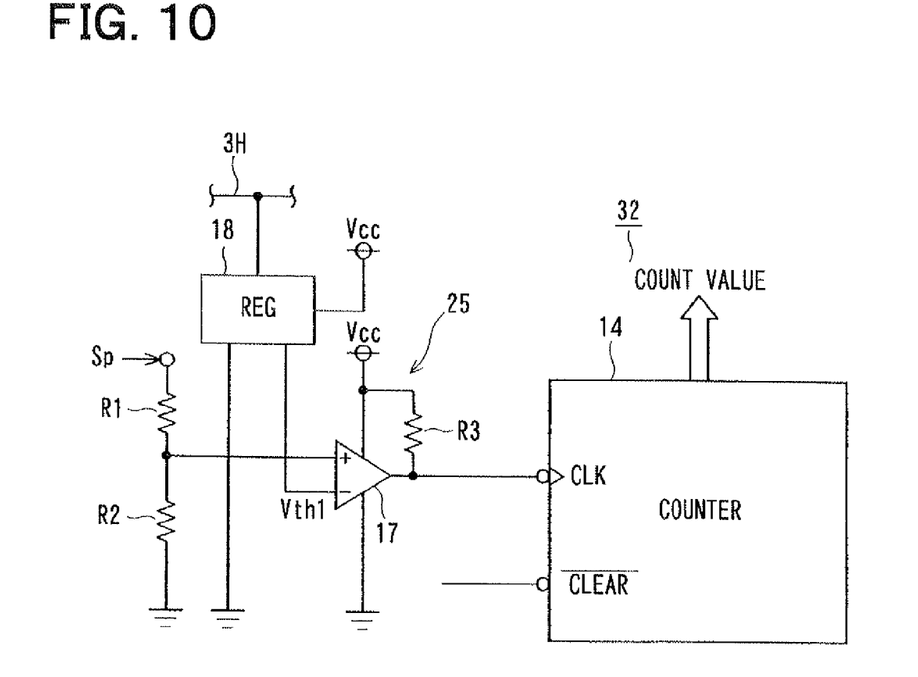
FIG. 10 is a diagram showing an ID determining circuit according to the second embodiment.

A communication network system according to a second embodiment of the present invention will be described with reference to FIG. 9 and FIG. 10. The communication network system includes the master 1, a plurality of slaves 31a-31c, and the communication buses 3H and 3L. The slaves 31a-31c can operate as communication slaves. The slaves 31a-31c are coupled with the master 1 through the communication buses 3H and 3L in a daisy chain manner. Each of the slaves 31a-31c includes the receiver (REC) 8, the transmitter 9, the holding circuit 11, the voltage determining circuit (VOL) 13, the current sensor (CURRENT) 22, an ID determining circuit (ID) 32, and a control device 33. In the present embodiment, the transmitter 9 is disposed on the downstream side of each of the slaves 31a-31c. The holding circuit 11 includes the diode 11a and the capacitor 11b coupled in series. The capacitor 11b has a capacitance sufficient to provide time differences in rising times of bus voltages VB detected at the slaves 31a-31c.

Each of the slaves 31a-31c further includes a voltage determining circuit (not shown) that has a configuration similar to the voltage determining circuit 13. The voltage determining circuit is used for comparing the bus voltage VB with a threshold voltage Vth2 so as to determine a change between a power-supply phase and a communication phase. As shown in FIG. 10, the ID determining circuit 23 includes the voltage determining circuit 25 described in the reference example and the counter 14 described in the first embodiment. The counter 14 counts at falling edges of pulse signals output from the comparator 17.

Figure 11:
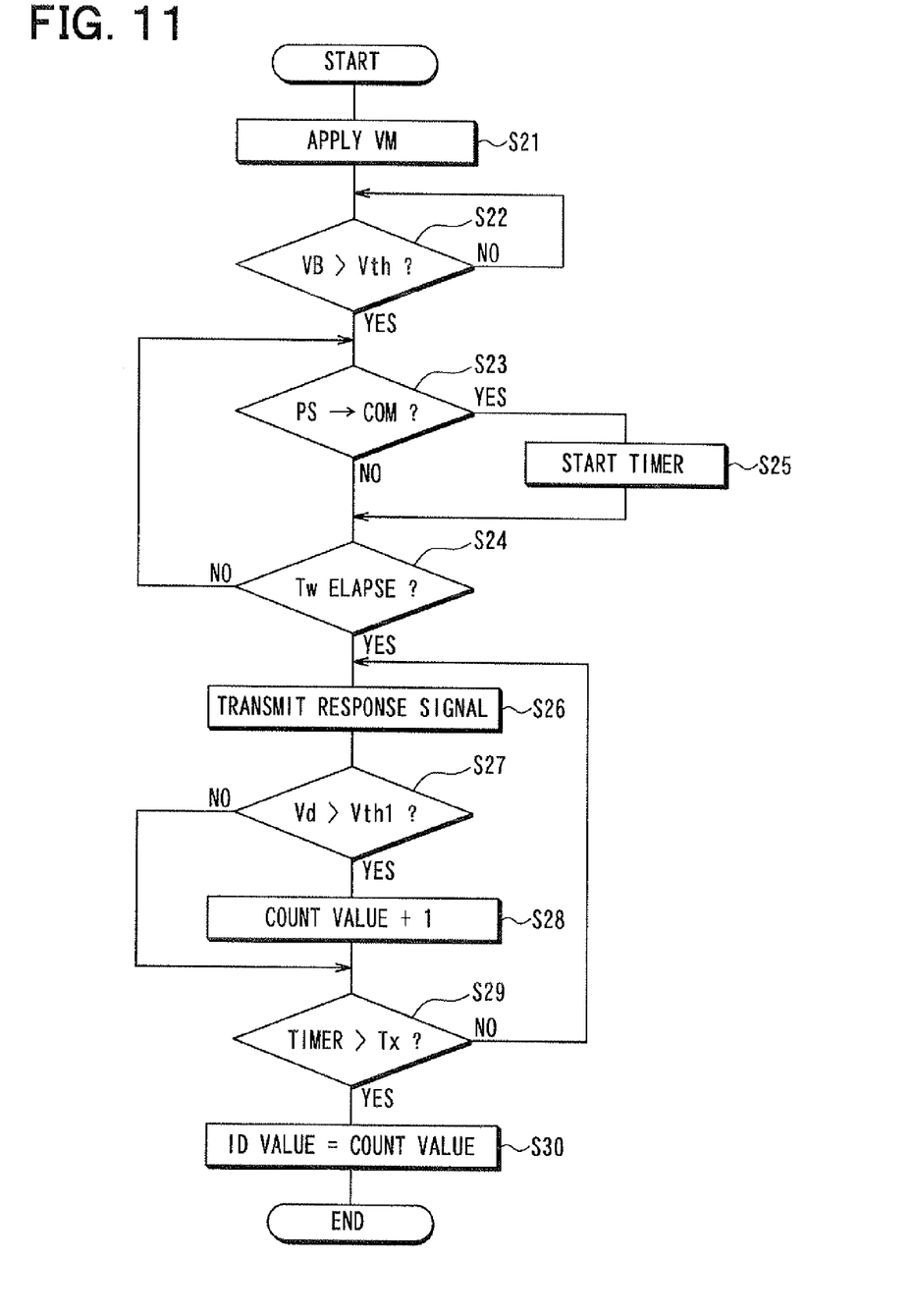
FIG. 11 is a flow diagram showing a process performed by a master and slaves in the communication network system according to the second embodiment.
Figure 12A:
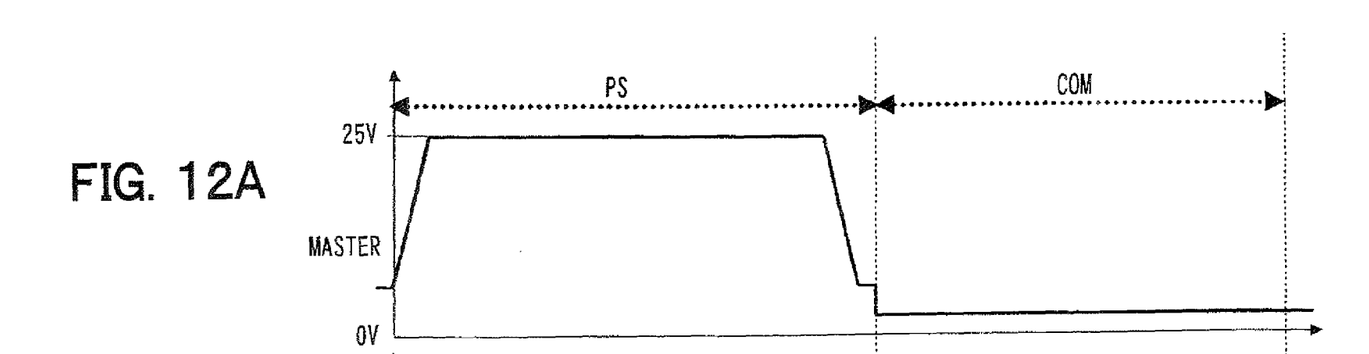
FIG. 12A is a timing diagram showing a voltage applied by the master and FIG. 12B to FIG. 12D are timing diagrams showing bus voltages and electric currents detected by the slaves according to the second embodiment.
Figure 12B:
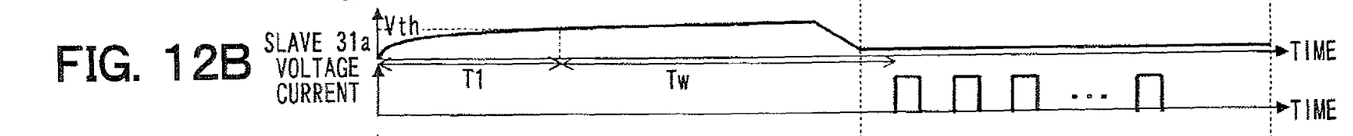
Figure 12C:
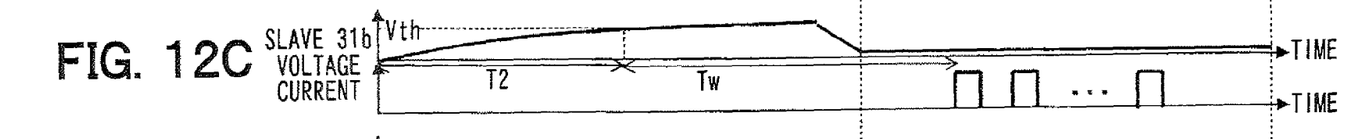
Figure 12D:
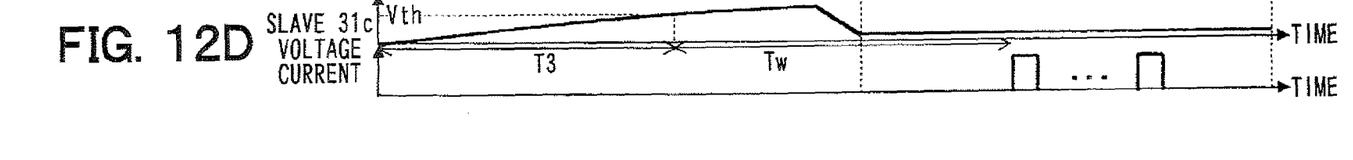

An operation of the communication network system according to the present embodiment will be described with reference to FIG. 11 and FIG. 12A to FIG. 12D. In a process shown in FIG. 11, when the master 1 starts to apply a power-source voltage VM to the communication bus 3H at S21, the control device 33 in each of the slaves 31a-31d determines whether the output signal of the voltage determining circuit 13 transitions to the high level at S22. As shown in FIG. 12B to FIG. 12D, the rising times of the bus voltage VB detected at the slaves 31a-31c are $T_1$-$T_3$, respectively, and are different from each other.

When the control device 33 determines that the output signal of the voltage determining circuit 13 transitions to the high level, which corresponds to "YES" at S22, the process proceeds to S23. At S23, the control device 33 determines whether a phase changes from the power-supply phase (PS) to the communication phase (COM). At S24, the control device 33 determines whether a predetermined waiting time Tw elapses. While both the determination results at S23 and S24 are "NO," the process at S23 and S24 is repeated. As shown in FIG. 12A to FIG. 12D, the sum of each of rising time $T_1$-$T_3$ and the waiting time Tw is longer than a time when the phase changes from the power-supply phase to the first communication phase. Therefore, the determination result at 323 becomes "Yes" earlier than the determination result at S24. When the phase changes to the communication phase, the process proceeds to S25, and the control device 33 starts to measure a predetermined time with a timer included in the control device 33. The timer may be hardware or software. Then, the process proceeds to S24.

When the waiting time Tw elapses, which corresponds to "YES" at S24, the process proceeds to S26, and the control device 33 turns on the switch 9a of the transmitter 9 so as to transmit a response signal. After the waiting time Tw elapses, each of the slaves 31a-31c periodically outputs the response signal as shown in FIG. 12B to 12D in a cycle from S26 to S29. In the present embodiment, the transmitter 9 is disposed on the downstream side of each of the communication slaves 31a-31c. Thus, the current sensor 22 in one of the slaves 31a-31c also detects a current change generated when the transmitter 9 in the one of the slaves 31a-31c transmits the response signal.

When the voltage determining circuit 25 receives a pulsed signal Sp from the current sensor 22 and a detected voltage Vd of the comparator 17 exceeds the threshold voltage Vth1, which corresponds to "YES" at S27, the output signal of the comparator 17 changes. At S28, the counter 14 counts at the falling edge of the output signal of the comparator 17. In other words, the counter 14 increments the count value by 1. During the communication phase, each of the slaves 31a-31c periodically transmits the response signal for a predetermined time Tx that is determined based on the maximum number of slaves coupled with the communication buses 3H and 3L. For example, the predetermined time Tx is determined so that a slave coupled at a downstream end of the communication buses 3H and 3L can determine "YES" at S24 and can output the first response signal at S26. The predetermined time Tx corresponds to an ID setting time.

At S29, the control device 33 determines whether the timer, which starts to measure at S25, has measured the predetermined time Tx. Until the timer measures the predetermined time Tx, which corresponds to "NO" at S29, the process proceeds to S26, and the transmitter 9 periodically transmits the response signal. When the timer measures the predetermined time Tx, which corresponds "YES" at S29, the control device 33 sets the count value output from the counter 14 in the ID determining circuit 32 at the time to the ID value. Thus, the ID value of each of the slaves 31a-31c is determined based on the maximum connection number of slaves. For example, when the maximum connection number of slaves is 15, the ID value of the slave 31a is set to 15, the ID value of the slave 31b is set to 14, and the ID value of the slave 31c is set to 13.

As described above, when the master 1 starts to charge the capacitor 11b through the communication buses 3H and 3L for the first time and the voltage determining circuit 13 determines that the bus voltage VB exceeds the threshold voltage Vth, the control device 33 transmits the response signal from the transmitter 9 after the waiting time Tw elapses. The ID determining circuit 32 counts the number of current change detected by the current sensor 22 until the predetermined ID setting time Tx elapses, and the control device 33 sets the ID value based on the count value. Thus, the slaves 31a-31c can appropriately set the ID values unique to each other without inserting a switch having a low on-resistance into the communication buses 3H and 3L.

Third Embodiment

Figure 13:
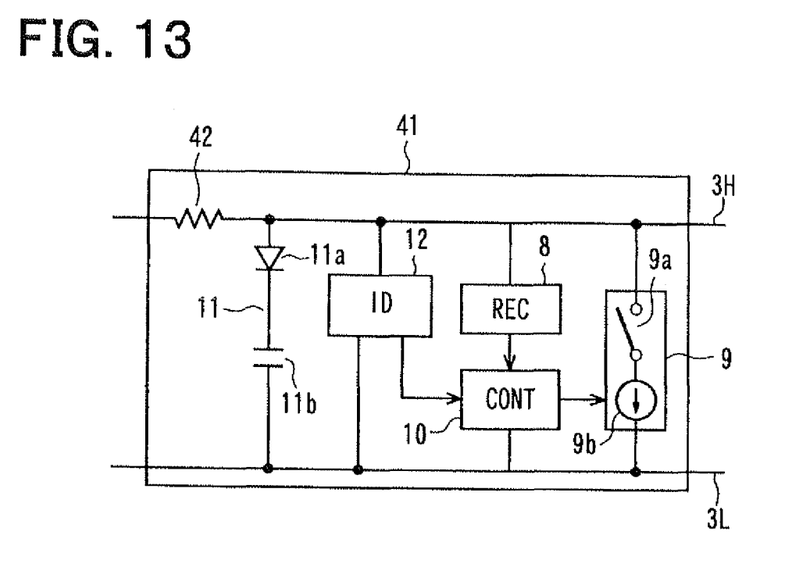
FIG. 13 is a diagram showing a slave according to a third embodiment of the present invention.

A slave 41 according to a third embodiment of the present invention will be described with reference to FIG. 13. The slave 41 can operate as a communication slave. The slave 41 includes the receiver (REC) 8, the transmitter 9, the control device (CONT) 10, the holding circuit 11, and the ID determining circuit (ID) 12 in a manner similar to the slaves 2a-2c according to the first embodiment. In addition, the slave 41 includes a resistance element 42. The resistance element 42 is inserted into the communication bus 3H at upstream of the holding circuit 11. Thus, the capacitor 11b of the holding circuit 11 is charged through the resistance element 42.

Because the slave 41 includes the resistance element 42 in the communication bus 3H, the capacitance of the capacitor 11b can be reduced compared with the capacitor 11b in each of the slaves 2a-2c in a case where charge time constants are set to be the same. Thus, a dimension of the capacitor 11b can be reduced, and the slave 41 can have a small dimension. In a case where a length of the communication buses 3H and 3L between the slaves 41 is short, because resistance values of resistance components of the communication buses 3H and 3L are low, the charge time constant is low. Thus, only by the resistance component in a manner similar to the slaves 2a-2c in the first embodiment, a sufficient rising time may not be provided. Even in such a case, the slave 41 can secure a sufficient charge time constant by including the resistance element 42.

Fourth Embodiment

Figure 14:
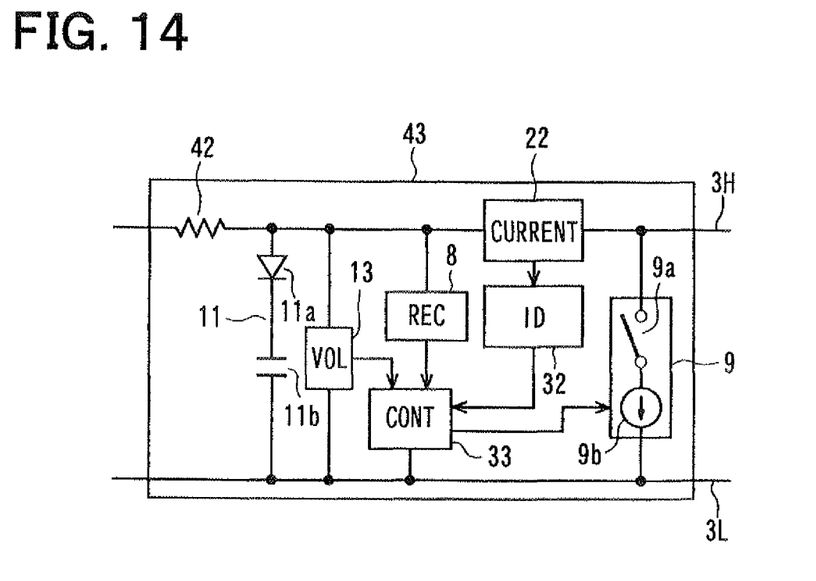
FIG. 14 is a diagram showing a slave according to a fourth embodiment of the present invention.

A slave 43 according to a fourth embodiment of the present invention will be described with reference to FIG. 14. The slave 43 can operate as a communication slave. The slave 43 includes the receiver (REC) 8, the transmitter 9, the holding circuit 11, the voltage determining circuit (VOL) 13, the current sensor (CURRENT) 22, the ID determining circuit (ID) 32, and the control device (CONT) 33 in a manner similar to the slaves 31a-31c according to the second embodiment. In addition, the slave 43 includes a resistance element 42. The resistance element 42 is inserted into the communication bus 3H at upstream of the holding circuit 11. Thus, the capacitor 11b of the holding circuit 11 is charged through the resistance element 42.

Because the slave 43 includes the resistance element 42 in the communication bus 3H, the capacitance of the capacitor 11b can be reduced compared with the capacitor 11b in each of the slaves 31a-31c in a case where charge time constants are set to be the same. Thus, a dimension of the capacitor 11b can be reduced, and the slave 43 can have a small dimension. In a case where a length of the communication buses 3H and 3L between the slaves 43 is short, because resistance values of resistance components of the communication buses 3H and 3L are low, the charge time constant is low. Thus, only by the resistance component in a manner similar to the slaves 31a-31c in the second embodiment, a sufficient rising time may not be provided. Even in such a case, the slave 43 can secure a sufficient charge time constant by including the resistance element 42.

Other Embodiments

Although the present invention has been fully described in connection with the preferred embodiments thereof with reference to the accompanying drawings, it is to be noted that various changes and modifications will become apparent to those skilled in the art.

In each of the above-described embodiments, the ID values may be set in ascending order and may be set in descending order. The ID values do not always have to be set in ascending order or descending order, and the ID values may be set so that at least each of the slaves can be identified.

In each of the slaves 2a-2c according to the first embodiment, the transmitter 9 is not limited to a current driving type and may also be a voltage driving type. In the reference example and the second embodiment, the ID determining circuits 23 and 32 may also have configurations described below. Instead of the JK flip flop 26 and the counter 14, a capacitor is coupled with the output terminal of the comparator 17. When the number of current change of the communication bus 3H detected by the current sensor 2 increases, the number of charges of the capacitor 17 increases, and a terminal voltage increases. Then, the control devices 24 and 33 read the terminal voltage with converting from analog data to digital data or refer a result compared by a plurality of comparators, and the control devices 24 and 33 set the ID values based on a level of the terminal voltage.

In the slaves 31a-31c according to the second embodiment, the transmitter 9 may also be disposed on the downstream side in a manner similar to the reference example. In this case, when the maximum connection number is 15, each ID value is set to a value from 14 to 0. An application of the slaves according to the above-described embodiments is not limited to a communication protocol such as DSI. The slaves according to the above-described embodiments may be applied to any communication network system that includes a master and a plurality of slaves coupled through a pair of buses in a daisy chain manner, and each slave dynamically sets an ID value.

What is claimed is:

1. A communication slave used in a communication network system in which a master and a plurality of communication slaves are coupled through a high-potential side bus and a low-potential side bus in a daisy-chain manner, the communication slave comprising:
   a control device that controls communication with the master;
   a capacitive element coupled between the high-potential side bus and the low-potential side bus, the capacitive element holding power that is supplied through the high-potential side bus and the low-potential side bus and that is used for operating the communication slave;
   a voltage determining portion that determines whether a voltage between the high-potential side bus and the low-potential side bus exceeds a threshold voltage; and
   a time measuring portion that measures a time from when a charge of the capacitive element through the high-potential side bus and the low-potential side bus is started to when the voltage determining portion determines that the voltage exceeds the threshold voltage, wherein
   the control device sets an ID value for communicating with the master based on a length of the time measured by the time measuring portion.

2. The communication slave according to claim 1, wherein the capacitive element is a capacitor that holds power supplied through the high-potential side bus and the low-potential side bus in order to hold the power used for operating the communication slave.

3. The communication slave according to claim 1, further comprising
   a resistance element inserted into the high-potential side bus at upstream of a point where the capacitive element is coupled.

4. A communication slave used in a communication network system in which a master and a plurality of communication slaves are coupled through a high-potential side bus and a low-potential side bus in a daisy-chain manner, the communication slave comprising:
   a control device that controls communication with the master;
   a capacitive element coupled between the high-potential side bus and the low-potential side bus, the capacitive element holding power that is supplied through the high-potential side bus and the low-potential side bus and that is used for operating the communication slave;
   a voltage determining portion that determines whether a voltage between the high-potential side bus and the low-potential side bus exceeds a threshold voltage; and
   a current detecting portion that detects current change generated in the high-potential side bus when the control device transmits a response signal to the master, wherein
   when a first charge of the capacitive element through the high-potential side bus and the low-potential side bus is started and the voltage determining portion determines that the voltage exceeds the threshold voltage, the control device transmits the response signal to the master after a waiting time elapses,
   the control device counts the number of current change detected by the current detecting portion until an ID setting time elapses, and
   after the ID setting time elapses, the control device sets an ID value for communicating with the master based on the number of current change.

5. The communication slave according to claim 4, wherein the capacitive element is a capacitor that holds the power supplied through the high-potential side bus and the low-potential side bus in order to hold the power used for operating the communication slave.

6. The communication slave according to claim 4, further comprising
   a resistance element inserted into the high-potential side bus at upstream of a point where the capacitive element is coupled.

* * * * *